United States Patent
Liu

(10) Patent No.: US 12,229,497 B2
(45) Date of Patent: Feb. 18, 2025

(54) VIRTUAL MULTIMEDIA SCENARIO EDITING METHOD, ELECTRONIC DEVICE, AND STORAGE MEDIUM

(71) Applicant: ALIBABA INNOVATION PRIVATE LIMITED, Singapore (SG)

(72) Inventor: Chengzhe Liu, Hangzhou (CN)

(73) Assignee: ALIBABA INNOVATION PRIVATE LIMITED, Singapore (SG)

( * ) Notice: Subject to any disclaimer, the term of this patent is extended or adjusted under 35 U.S.C. 154(b) by 72 days.

(21) Appl. No.: 17/744,958

(22) Filed: May 16, 2022

(65) Prior Publication Data

US 2022/0382963 A1 Dec. 1, 2022

(30) Foreign Application Priority Data

May 28, 2021 (CN) .......................... 202110590855.4

(51) Int. Cl.

| | |
|---|---|
| *G06F 3/048* | (2013.01) |
| *G06F 3/0482* | (2013.01) |
| *G06F 3/0484* | (2022.01) |
| *G06F 3/16* | (2006.01) |
| *G06F 40/143* | (2020.01) |
| *G06F 40/166* | (2020.01) |

(52) U.S. Cl.
CPC .......... *G06F 40/166* (2020.01); *G06F 3/0482* (2013.01); *G06F 3/0484* (2013.01); *G06F 3/165* (2013.01); *G06F 40/143* (2020.01)

(58) Field of Classification Search
CPC ...... G06F 3/0482; G06F 3/0484; G06F 3/165; G06F 40/143; G06T 13/40
See application file for complete search history.

(56) References Cited

U.S. PATENT DOCUMENTS

| | | |
|---|---|---|
| 7,236,486 B2 | 6/2007 | Baker et al. |
| 7,801,896 B2 | 9/2010 | Szabo |
| 8,028,276 B1 | 9/2011 | Bessonov |
| 8,073,742 B2 | 12/2011 | Caballero et al. |
| 8,516,266 B2 | 8/2013 | Hoffberg et al. |
| 8,549,410 B2 | 10/2013 | Hoyle |
| 8,615,708 B1 | 12/2013 | Hidayat et al. |
| 9,201,558 B1 | 12/2015 | Dingman et al. |
| 9,268,748 B2 | 2/2016 | Davis |

(Continued)

*Primary Examiner* — Claudia Dragoescu
(74) *Attorney, Agent, or Firm* — James J. DeCarlo; Greenberg Traurig, LLP

(57) ABSTRACT

Provided in the disclosed embodiments are a virtual multimedia scenario editing method, an electronic device, and a storage medium. The virtual multimedia scenario editing method includes: displaying a scenario editing interface, the scenario editing interface including a visual graphic editing region, a script editing region, and scenario editing tool options; acquiring a trigger operation performed with respect to the scenario editing tool option; generating a scenario element editing operation according to the trigger operation; displaying, in the visual graphic editing region, a graphic markup card corresponding to the scenario element editing operation; and generating and displaying, in the script editing region, a markup language script corresponding to the scenario element editing operation. The solution of the disclosed embodiments reduces development difficulties faced by a user, improves development efficiency, and is compatible with existing development processes.

20 Claims, 10 Drawing Sheets

(56) References Cited

U.S. PATENT DOCUMENTS

| | | |
|---|---|---|
| 9,282,200 B2 | 3/2016 | Grosz et al. |
| 10,223,078 B2 | 3/2019 | Yang et al. |
| 2006/0036946 A1* | 2/2006 | Radtke .................. G06F 40/166 |
| | | 715/842 |
| 2007/0260973 A1 | 11/2007 | Kano et al. |
| 2008/0005659 A1 | 1/2008 | Fujimaki |
| 2008/0282143 A1 | 11/2008 | Hiyama et al. |
| 2008/0303826 A1* | 12/2008 | Schiff .................... G06F 40/109 |
| | | 345/473 |
| 2009/0287994 A1 | 11/2009 | Ichino |
| 2010/0088654 A1* | 4/2010 | Henhoeffer ......... G06F 3/04883 |
| | | 715/863 |
| 2013/0074129 A1 | 3/2013 | Reisman |
| 2014/0033078 A1* | 1/2014 | Goldman ................ G06F 3/167 |
| | | 715/757 |
| 2016/0321307 A1 | 11/2016 | Dingman et al. |
| 2018/0088915 A1* | 3/2018 | Yang ..................... G06F 40/186 |
| 2018/0133900 A1* | 5/2018 | Breazeal ................ B25J 19/026 |
| 2019/0155874 A1 | 5/2019 | Davis |
| 2019/0250694 A1* | 8/2019 | Mao ...................... G06F 3/0482 |
| 2020/0051302 A1* | 2/2020 | Subramonyam ....... G11B 27/34 |

* cited by examiner

VIRTUAL MULTIMEDIA SCENARIO EDITING METHOD, ELECTRONIC DEVICE, AND STORAGE MEDIUM

CROSS-REFERENCE TO RELATED APPLICATIONS

This application claims priority to Chinese Pat. Appl. No. 202110590855.4, filed May 28, 2021 and incorporated herein in its entirety.

BACKGROUND

Technical Field

Embodiments of the application relate to the field of computer technology and particularly to a virtual multimedia scenario editing method, an electronic device, and a storage medium.

Description of the Related Art

A markup language is a computer language that combines text and other information related to the text and can reveal details about a document's structure and means of processing. A specific markup language can also be used to describe a scenario and can carry a series of information such as the sound and action of a character, a live broadcast scenario, etc.

The development of virtual multimedia scenarios (e.g., a virtual broadcaster scenario) incurs a heavy development workload and has many personalized requirements. As such, the development process is difficult.

BRIEF SUMMARY

Accordingly, provided in the disclosed embodiments are a virtual multimedia scenario editing method, an electronic device, and a storage medium capable of solving at least part of the above problems.

In an embodiment, a virtual multimedia scenario editing method comprises displaying a scenario editing interface that includes a visual graphic editing region, a script editing region, and at least one scenario editing tool option. The method then includes acquiring a trigger operation performed with respect to the scenario editing tool option and generating a scenario element editing operation according to the trigger operation. In response, the method displays, in the visual graphic editing region, a graphic markup card corresponding to the scenario element editing operation. Finally, the method generates and displays, in the script editing region, a markup language script corresponding to the scenario element editing operation.

In another embodiment, an electronic device is described which includes a display, a processor, and a memory, wherein the display is used to display an application interface of a virtual multimedia scenario editing application. The application interface can include a visual graphic editing region, a script editing region, and at least one scenario editing tool option. The scenario editing tool option can be used to present a corresponding editing tool and to receive an operation of a user for the scenario editing tool option. The visual graphic editing region can be used to display a corresponding graphic markup card according to the operation. The script editing region can be used to display a corresponding markup language script according to the operation. In this embodiment, the memory can be used to store one or more executable instructions and data related to the virtual multimedia scenario editing application. The processor can be used to perform, according to the executable instructions and data read from the memory, an operation corresponding to the virtual multimedia scenario editing application.

In another embodiment, a computer storage medium having a computer program stored therein is disclosed, wherein when executed by a processor, the program implements the method according to the foregoing embodiments.

According to the technical solutions described herein, a scenario element editing operation can be generated according to a trigger operation performed with respect to at least one scenario editing tool option, and a graphic markup card corresponding to the scenario element editing operation can be displayed in a visual graphic editing region. Therefore, it is not necessary to directly carry out script development, thereby achieving low-code development of the scenario element editing operation, reducing development difficulties faced by a user, and improving the efficiency of development. In addition, a markup language script corresponding to the scenario element editing operation is generated and displayed in a script editing region. Therefore, the markup language script is obtained, and compatibility with existing development processes is improved.

BRIEF DESCRIPTION OF THE DRAWINGS

To describe the embodiments of the application or the technical solutions more clearly, the accompanying drawings to be used in the description of the embodiments are briefly described below. The accompanying drawings in the following description are merely some embodiments of the application, and a person of ordinary skill in the art could further obtain other accompanying drawings according to these accompanying drawings.

DETAILED DESCRIPTION

To allow those skilled in the art to better understand the technical solutions in the disclosed embodiments, the technical solutions In some embodiments will be described clearly and completely below with reference to the accompanying drawings In some embodiments. The described embodiments are merely some, rather than all the embodiments of the application. All other embodiments obtained by those of ordinary skill in the art based on the embodiments of the application shall fall within the scope of protection of the embodiments of the application. Specific implementations of the embodiments of the application will be further described below with reference to the accompanying drawings of the embodiments of the application.

Figure 1A:
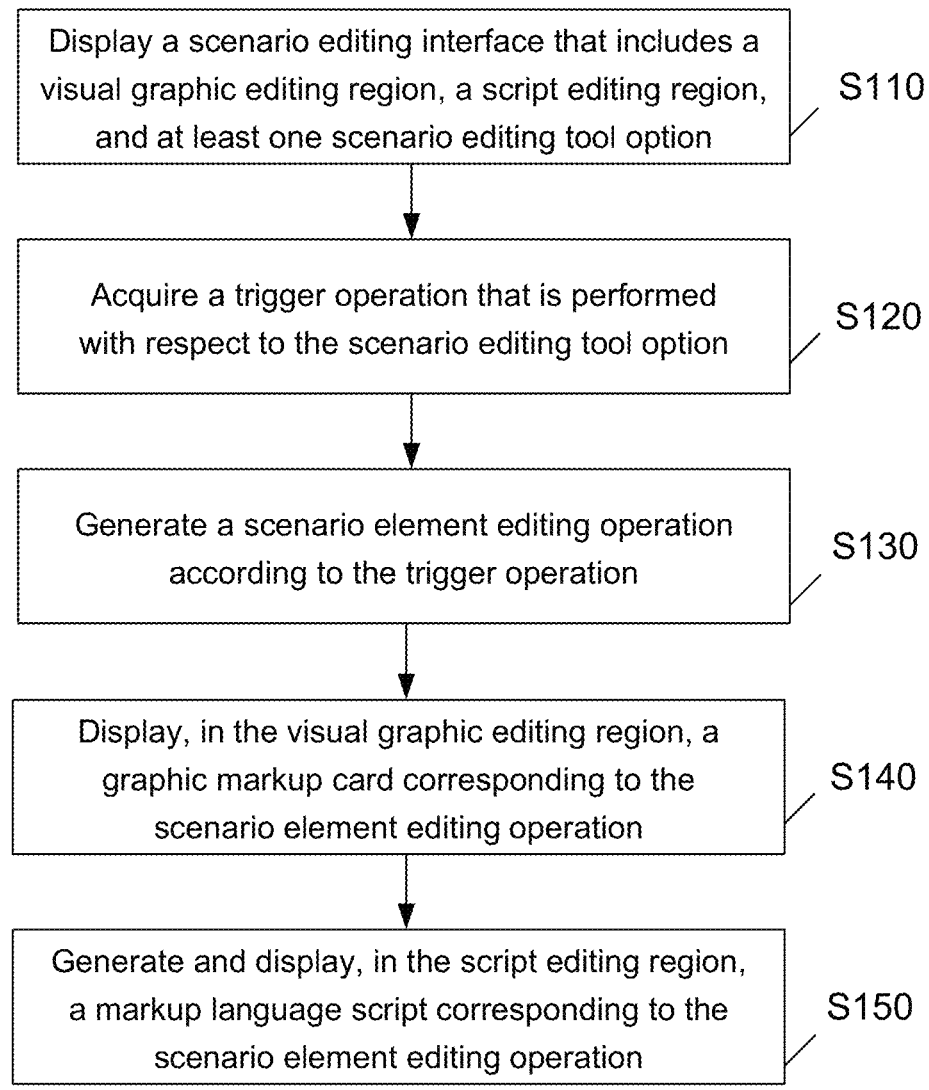
FIG. 1A is a flow diagram illustrating a virtual multimedia scenario editing method according to some of the example embodiments.

FIG. 1A is a flow diagram illustrating a virtual multimedia scenario editing method according to some of the example embodiments. The solution of this embodiment is applicable to any appropriate electronic device having data processing capabilities, including but not limited to a server, a mobile terminal (such as a mobile phone, a tablet, etc.), a desktop or laptop computer, etc.

The virtual multimedia scenario editing method, as shown in FIG. 1A, includes the following steps.

Step S110: display a scenario editing interface that includes a visual graphic editing region, a script editing region, and at least one scenario editing tool option.

In some embodiments, the scenario editing interface is applicable to the editing of any appropriate scenarios, including, but not limited to, a live broadcast scenario, an e-commerce scenario, an online education scenario, a conference scenario, etc., such that a corresponding editing operation can be performed by means of the scenario editing interface to finally form a corresponding virtual scenario.

Respective positions of the visual graphic editing region, the script editing region, and the scenario editing tool option in the scenario editing interface may vary. In other words, the above regions and editing tools may be arranged in any manner. In one embodiment, the visual graphic editing region and the script editing region are arranged in parallel in the scenario editing interface. The scenario editing interface may further include other regions. The scenario editing interface may be an interface of an application, may also be a page of a browser, etc.

Figure 1B:
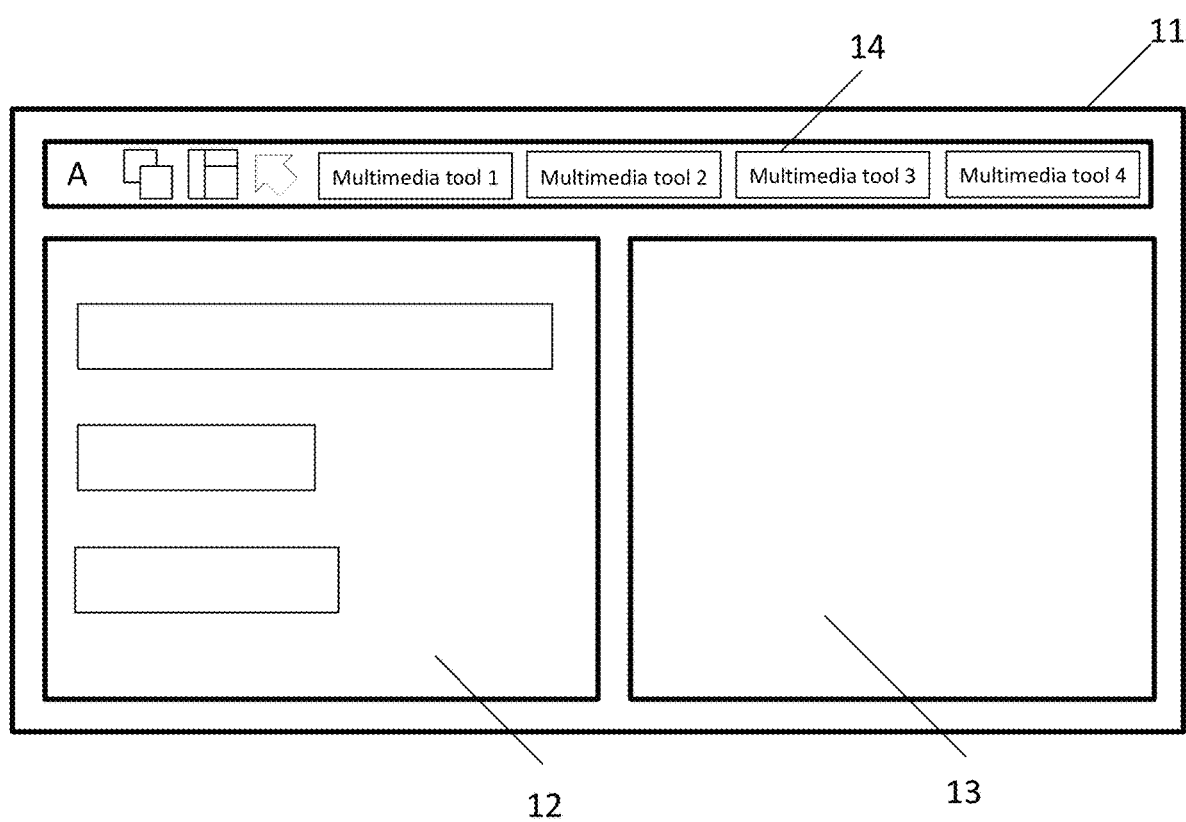
FIG. 1B is a block diagram of a scenario editing interface of a scenario editing method according to some of the example embodiments.

The scenario editing tool option may include a multimedia tool for performing virtual multimedia scenario editing and other editing tools for, by example, text inputting, deletion, cutting, copying, pasting, selection, etc. In an interface example 11 shown in FIG. 1B, at least one scenario editing tool option including multimedia tools 1 through 4 is presented as a toolbar 14. For example, the toolbar 14 may be arranged on an upper portion of an interface and may also be used as a floating toolbar that can be dragged to any position on the interface. A visual graphic editing region 12 and a script editing region 13 are arranged in parallel in the scenario editing interface. The arrangement of this example is provided as an example and does not limit to the arrangement of the disclosed embodiments.

Step S120: acquire a trigger operation that is performed with respect to the scenario editing tool option.

The trigger operation described herein includes, but is not limited to, a gesture operation, a voice recognition trigger, a computer-based vision recognition trigger, and triggers performed by means of a peripheral device such as a mouse or a keyboard. An operation mode of the trigger operation includes, but is not limited to, a drag operation, a click operation (single-click, double-click, or a long-press operation), a sliding operation, etc.

A corresponding monitoring function can be configured for the scenario editing tool option in a scenario editor where the scenario editing interface is located. A trigger position of the monitoring function may be determined based on the position of the scenario editing tool option. In other words, the trigger operation can be a response to an operation performed at a specific position, and an operation recognized at said position can be determined to be a trigger operation. The trigger position of the monitoring function may also be determined based on the position of a virtual character or object corresponding to the trigger operation. In other words, the trigger operation can be a response to a mode-based operation. For example, an operation having a specific mode detected at an arbitrary position may also be recognized as a trigger operation regardless of the position thereof. For example, an operation having a specific mode detected at the position of a virtual character or object may be recognized as a corresponding trigger operation (not at the position of the scenario editing tool option).

Step S130: generate a scenario element editing operation according to the trigger operation.

Correspondence may be established between the scenario element editing operation and an identifier of a trigger operation type corresponding thereto. In addition, the correspondence may be pre-stored, and the scenario element editing operation may be determined based on this correspondence. For example, the trigger operation is performed for a virtual character or other virtual objects. The correspondence further includes an identifier of the virtual character or identifiers of the other virtual objects. That is, a correspondence between the scenario element editing operation, the identifier of the trigger operation type, and the identifier of the virtual character or the identifiers of the other virtual objects can be pre-stored.

Step S140: display, in the visual graphic editing region, a graphic markup card corresponding to the scenario element editing operation.

The graphic markup card corresponding to the scenario element editing operation may be displayed while the scenario element editing operation is generated. Alternatively, the scenario element editing operation may be determined before displaying the corresponding graphic markup card.

Step S150: generate and display, in the script editing region, a markup language script corresponding to the scenario element editing operation.

The corresponding markup language script and the graphic markup card corresponding to the scenario element editing operation may be simultaneously displayed.

The markup language script corresponding to the scenario element editing operation may be determined according to correspondence. In some examples, the correspondence may be pre-stored and may be used to indicate a correspondence between an operation element of the scenario element editing operation and a corresponding script and to indicate grammar logic.

In some other examples, the correspondence may be pre-stored and may be used to indicate a mapping relationship between the graphic markup card corresponding to the scenario element editing operation and the corresponding markup language script.

According to the solution provided by the embodiments of the application, a scenario element editing operation can be generated according to a trigger operation performed with respect to at least one scenario editing tool option, and a graphic markup card corresponding to the scenario element editing operation can be displayed in a visual graphic editing region. Therefore, it is not necessary to directly carry out script development, thereby achieving low-code development of the scenario element editing operation, reducing development difficulties faced by a user, and improving development efficiency. In addition, a markup language script corresponding to the scenario element editing operation is generated and displayed in a script editing region. Therefore, the markup language script is obtained, and compatibility with existing development processes is improved.

Specifically, in an example of a live broadcast scenario, a live broadcast scenario editing interface may be displayed. The live broadcast scenario editing interface includes a visual graphic editing region, a script editing region, and a live broadcast scenario editing tool option. A live broadcast scenario element editing operation includes, but is not limited to, a broadcaster action editing operation, a broadcaster sound editing operation, an editing operation related to a recommended product, etc. The broadcaster action editing operation includes, but is not limited to, an offer action, a try-on action, a try-out action, an interactive action, etc. The broadcaster sound editing operation includes, but is not limited to, a pause editing operation, a stress editing operation, an inflection editing operation, and a reading rhythm editing operation.

In an example of an online education scenario, a teaching scenario editing interface may be displayed. The teaching scenario editing interface includes a visual graphic editing region, a script editing region, and a teaching scenario editing tool option. Specifically, a teaching scenario element editing operation includes, but is not limited to, a teacher action editing operation, a teaching sound editing operation, an editing operation related to recommended courseware, teaching material, teaching aid, etc. The teaching action editing operation includes, but is not limited to, an indication action, a mouth action, a finger action, a facial expression action, a body action, etc. The teaching sound editing operation includes, but is not limited to, a pause editing operation, a stress editing operation, an inflection editing operation, and a reading rhythm editing operation.

In an example of a conference scenario, a conference scenario editing interface may be displayed. The conference scenario editing interface includes a visual graphic editing region, a script editing region, and a live broadcast scenario editing tool option. Specifically, a conference scenario element editing operation includes, but is not limited to, an action editing operation for a conference participant or a presenter, a sound editing operation for the conference participant or the presenter, and an editing operation related to a conference theme, etc. The action editing operation includes, but is not limited to, a gesture action, an indication action, an explanation action, an interactive action, etc. The sound editing operation includes, but is not limited to, a pause editing operation, a stress editing operation, an inflection editing operation, and a reading rhythm editing operation.

In another embodiment, to further improve the efficiency of code development, the scenario editing tool option includes an editing tool option for a virtual character in a scenario, and/or an editing tool option for virtual objects other than the character in the scenario. The generating a scenario element editing operation according to the trigger operation includes generating, according to the trigger operation, an editing operation for a corresponding virtual character and/or other virtual objects in a virtual scenario. In other words, a corresponding editing operation can be generated according to the trigger operation performed with respect to the editing tool option on the interface, thereby achieving a highly efficient and convenient editing operation, and further improving the efficiency of code development.

In some embodiments, to further improve the efficiency of the editing operation, the editing tool option for the virtual character may include a selection control tool and a multimedia control tool for the virtual character. The multimedia control tool for the virtual character includes at least one of: a script line control tool, a sound control tool, and an action control tool. The generating, according to the trigger operation, an editing operation for a corresponding virtual character in a virtual scenario includes: displaying, in the visual graphic editing region and according to a trigger operation performed with respect to the selection control tool, the corresponding virtual character in the virtual scenario; and generating a multimedia editing operation for the virtual character according to a trigger operation performed with respect to the multimedia control tool for the virtual character. In other words, a corresponding editing operation can be generated according to the trigger operation performed with respect to the editing tool option for the virtual character on the interface, thereby improving the efficiency of the editing operation for the virtual character, and accordingly improving the efficiency of scenario editing.

In addition, in some embodiments, to improve the efficiency of editing the virtual character, the method further includes switching, according to the trigger operation performed with respect to the selection control tool, the multimedia control tool for the virtual character from a non-triggerable state to a triggerable state. In other words, the multimedia control tool for the virtual character is switched from the non-triggerable state to the triggerable state, thereby eliminating the probability that an editing operation is accidentally performed on the virtual character and improving the efficiency of editing the virtual character.

In some embodiments, to improve the efficiency of editing the virtual scenario, the generating a multimedia editing operation for the virtual character according to a trigger operation performed with respect to the multimedia control tool for the virtual character includes: displaying a sound editing window for a first line segment of script lines of the virtual character according to a trigger operation performed with respect to the sound control tool; generating a sound editing operation for the first line segment according to sound editing information inputted in the sound editing window for the first line segment; and/or displaying an action material library for the first line segment according to a trigger operation performed with respect to the action control tool; transferring, according to a selection operation performed on a first target action material in the action material library for the first line segment, the first target action material to the visual graphic editing region; and acquiring an action editing operation for the first line segment when a graphic markup card of the first target action material is generated in the visual graphic editing region. In other words, a corresponding editing operation can be generated according to the trigger operation performed with respect to the sound control tool or the action control tool for the virtual character on the interface, thereby improving the efficiency of the sound editing operation or the action editing operation for the virtual character, and accordingly improving the efficiency of scenario editing.

In some embodiments, to improve the efficiency of editing the virtual scenario, the displaying, in the visual graphic editing region, a graphic markup card of the scenario element editing operation includes displaying, in the visual graphic editing region, a graphic markup card of the sound editing operation. The graphic markup card includes the sound editing information and the first line segment. In other words, since the graphic markup card including the sound editing information and the first line segment is displayed in the visual graphic editing region, the editing operation can be visually marked up effectively, thereby improving the efficiency of scenario editing.

In some embodiments, to improve the efficiency of editing the virtual scenario, the method further includes displaying a text input window in the visual graphic editing region according to a trigger operation performed with respect to the line control tool to acquire the script lines of the virtual character in the text input window; and acquiring the first line segment according to a selection operation performed on at least part of the script lines. In other words, the first line segment is acquired according to the selection operation performed on at least part of the script lines, thereby improving the efficiency of editing the virtual character, and accordingly improving the efficiency of editing the virtual scenario.

In the above various embodiments, the sound editing information indicates at least one of: a sound pause duration, sound pronunciation, sound rhythm, sound speed, and sound content correction information of the first line segment. At least one of the sound pause duration, the sound pronunciation, the sound rhythm, the sound speed, and the sound content correction information of the first line segment can indicate a type of sound editing, and can improve the editing operation for the virtual character, thereby obtaining a realistic virtual character that can better meet requirements of a scenario.

In some embodiments, to improve the efficiency of sound editing, the displaying a sound editing window for a first line segment of script lines of the virtual character according to a trigger operation performed with respect to the sound control tool includes: displaying a floating toolbar at the first line segment according to the trigger operation performed with respect to the sound control tool; and displaying the sound editing window according to a selection operation performed on a sound editing control in the floating toolbar, and hiding the floating toolbar. In other words, the floating toolbar enables an operation to be performed flexibly, and the sound editing window is displayed according to the selection operation performed on the sound editing control in the floating toolbar, thereby improving the efficiency of sound editing. In addition, in this implementation manner, the floating toolbar is hidden while the sound editing window is displayed, thereby eliminating the probability of accidentally performing an editing operation.

In some embodiments, to improve the efficiency of editing the virtual scenario, the generating a multimedia editing operation for the virtual character according to a trigger operation performed with respect to the multimedia control tool for the virtual character includes: displaying an action material library for a second line segment of script lines of the virtual character according to a trigger operation performed with respect to the action control tool; transferring, according to a selection operation performed on a second target action material in the action material library for the second line segment, the second target action material to the visual graphic editing region; acquiring an action editing operation for the second line segment when a graphic markup card of the second target action material is generated in the visual graphic editing region; and/or displaying a sound editing window for the second line segment according to a trigger operation performed with respect to the sound control tool; and generating a sound editing operation for the second line segment according to sound editing information inputted in the sound editing window for the second line segment. In other words, a corresponding editing operation can be generated according to the trigger operation performed with respect to the sound control tool or the action control tool for the virtual character on the interface, thereby improving the efficiency of the sound editing operation or the action editing operation for the virtual character, and accordingly improving the efficiency of scenario editing.

In some embodiments, to improve the space utilization efficiency of the interface, the displaying an action material library for a second line segment of script lines of the virtual character according to a trigger operation performed with respect to the action control tool includes: dynamically popping up an action material display board along a boundary of the script editing region according to the trigger operation performed with respect to the action control tool so as to block the script editing region, and causing the action control tool to enter an unavailable state. Various action materials for the second line segment of the script lines of the virtual character are arranged on the action material display board. In other words, the action material display board is dynamically popped up along the boundary of the script editing region to block the script editing region. Therefore, the display board currently having a higher operation priority is displayed, and the script editing region currently having a lower operation priority is hidden, thereby improving the space utilization efficiency of the interface. In addition, in this implementation manner, the trigger operation performed with respect to the action control tool can also cause the action control tool to enter the unavailable state, thereby eliminating the probability of accidentally performing an operation when editing is performed on the interface.

In some embodiments, to improve the efficiency of editing the virtual scenario, the method further includes displaying a text input window in the visual graphic editing region according to a trigger operation performed with respect to the line control tool so as to acquire the script lines of the virtual character in the text input window; and acquiring the second line segment according to a selection operation performed on at least part of the script lines. In other words, the second line segment is acquired according to the selection operation performed on at least part of the script lines, thereby improving the efficiency of editing the virtual character, and accordingly improving the efficiency of editing the virtual scenario.

In some embodiments, to improve the efficiency of editing the virtual character, the acquiring the second line segment according to a selection operation performed on at least part of the script lines includes: displaying an action editing timeline corresponding to the script lines of the virtual character, the action editing timeline including a draggable control for indicating an action node; and determining the second line segment according to a correspondence between a drag position of the draggable control on the action editing timeline and characters of the script lines of the virtual character. In other words, the draggable control for indicating an action node included in the action editing timeline enables an operation to be performed quickly to select the second line segment, thereby further improving the efficiency of editing the virtual character.

In some embodiments, to improve the efficiency of editing the virtual scenario, the editing tool option for other virtual objects includes a billboard control tool, and the generating, according to the trigger operation, an editing operation for a corresponding virtual object in a virtual scenario includes: displaying an interactive billboard material library according to a trigger operation performed with respect to the billboard control tool; transferring, according to a selection operation performed on a target interactive billboard in the interactive billboard material library, the target interactive billboard to the visual graphic editing region; and acquiring an interactive billboard editing operation for the target interactive billboard when a graphic markup card of the target interactive billboard is generated in the visual graphic editing region. In other words, a corresponding editing operation can be generated according to a trigger operation performed with respect to a billboard editing tool option on the interface, thereby improving the efficiency of a billboard editing operation, and accordingly improving the efficiency of scenario editing.

In some embodiments, to improve the efficiency of editing the virtual scenario, the generating, according to the trigger operation, an editing operation for other virtual objects in a virtual scenario further includes: displaying an editable window of the target interactive billboard according to the selection operation performed on the target interactive billboard; acquiring product information inputted in the editable window; and displaying, in the visual graphic editing region and below the graphic markup card of the scenario element editing operation, a graphic markup card including the product information. In other words, the graphic markup card including the product information is displayed in the visual graphic editing region. Therefore, the product information can be visually marked up effectively, thereby improving the efficiency of editing the virtual scenario.

In some embodiments, to improve the readability of the markup language script and script processing efficiency, the generating and displaying, in the script editing region, a markup language script corresponding to the scenario element editing operation includes adjusting the markup language script in the script editing region according to the product information, so that the adjusted markup language script includes a character string of the product information. In other words, the adjusted markup language script includes the character string of the product information, thereby improving the readability of the markup language script and script processing efficiency.

In some embodiments, to improve script generation efficiency, the generating and displaying, in the script editing region, a markup language script corresponding to the scenario element editing operation includes determining a markup language script corresponding to the graphic markup card of the scenario element editing operation; and generating and displaying the markup language script in the script editing region. In other words, a markup language script can be generated according to the markup language script corresponding to the graphic markup card, thereby improving script generation efficiency, and improving a correspondence between the graphic markup card and the markup language script.

In some embodiments, to improve the efficiency of previewing the virtual scenario, the method further includes locally fusing respective graphic markup cards of all visual graphic operations according to a scenario association order of respective visual graphic operations in the visual graphic editing region so as to generate a local scenario preview file. In other words, since a low-code graphic markup card is used, and since the low-code graphic markup card has higher playback efficiency than that of the markup language script, the efficiency of previewing the virtual scenario is improved.

In some examples, the graphic markup card is used to describe a markup language script of the visual graphic operation. The graphic markup card includes operation logic of the markup language script of the visual graphic operation. The graphic markup card of the visual graphic operation includes the scenario association order of the visual graphic operation and the operation logic of the corresponding markup language script. A markup language script of a corresponding visual graphic operation can be generated according to the graphic markup card.

In addition, the graphic markup card of the visual graphic operation includes information of each video frame finally presented. In other words, the graphic markup card includes corresponding video frames of a dynamic video presenting the markup language script, and therefore previewing can be achieved without a corresponding script player. All graphic markup cards can be fused according to the scenario association order of respective visual graphic operations to generate a local scenario preview file. The operation logic includes encapsulation logic, nested logic, reference logic, and inheritance logic.

In some embodiments, to support compatibility with existing script processing software frameworks of servers, the method further includes uploading the markup language script to a server so as to play a virtual scenario indicated by the markup language script. In other words, since the markup language script is uploaded to the server, the server can be used to play the virtual scenario indicated by the markup language script, and compatibility with existing script processing software frameworks of servers can be supported.

Figure 2A:
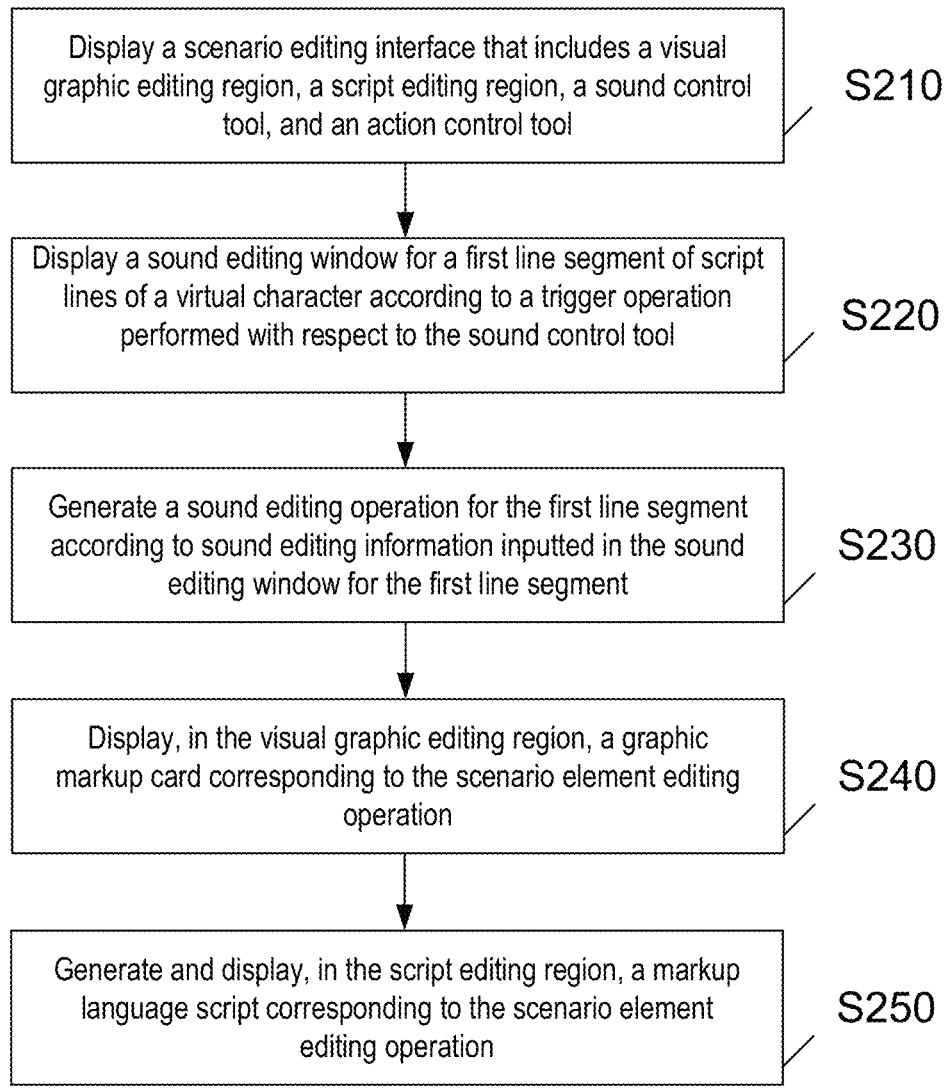
FIG. 2A is a flow diagram illustrating a scenario editing method according to some of the example embodiments.
Figure 2B:
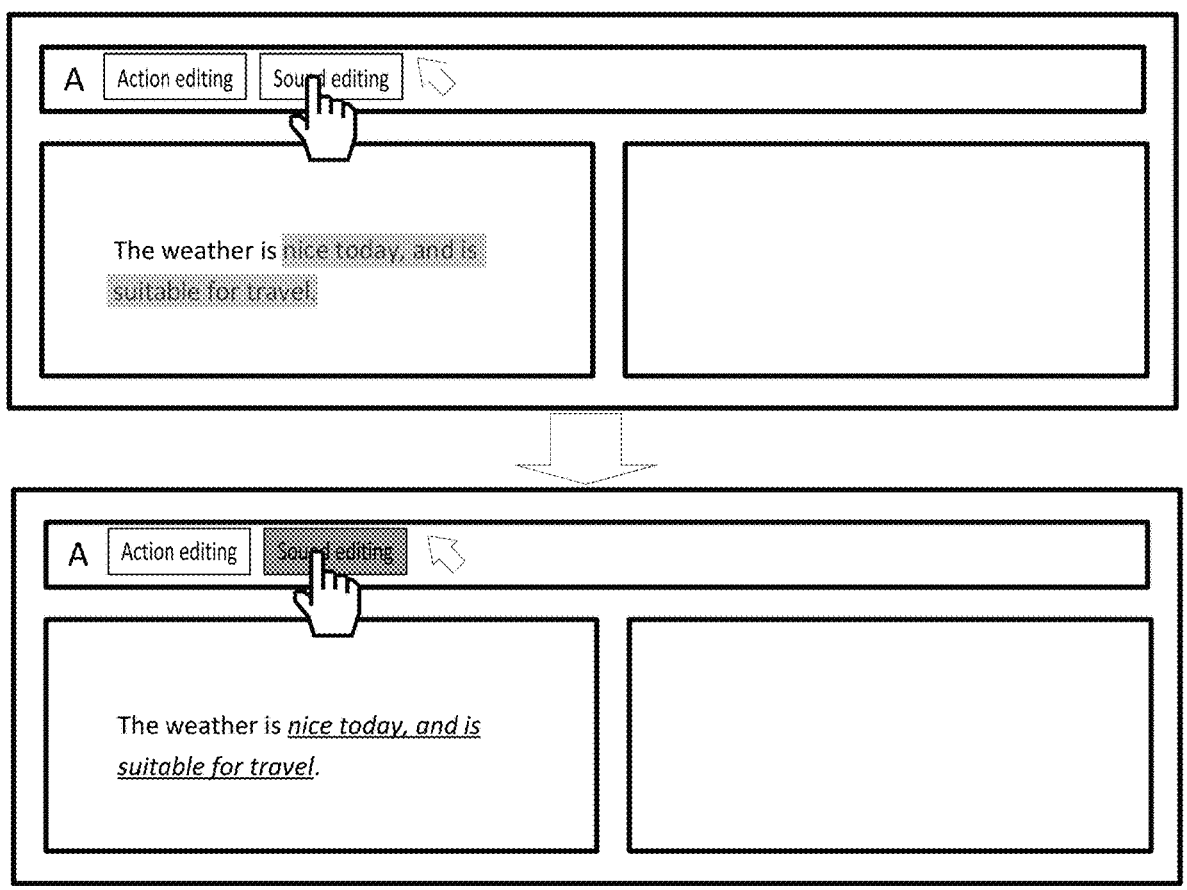
FIG. 2B is a block diagram of a change in a scenario editing interface according to some of the example embodiments.

FIG. 2A is a flow diagram illustrating a virtual multimedia scenario editing method according to some of the example embodiments. FIG. 2B is a block diagram of a change in a scenario editing interface according to some of the example embodiments. The virtual multimedia scenario editing method shown in FIG. 2A will be described below with reference to the change in the scenario editing interface in FIG. 2B. The virtual multimedia scenario editing method according to this embodiment includes the following steps.

Step S210: display a scenario editing interface that includes a visual graphic editing region, a script editing region, a sound control tool, and an action control tool.

Specifically, the sound control tool and the action control tool serving as multimedia control tools may be arranged in a floating toolbar or may be arranged in a fixed toolbar on an interface. Both the sound control tool and the action control tool may include an editing state and a non-editing state. For example, one of the sound control tool and the action control tool is selected to enter the editing state, and the other is in the non-editing state. Therefore, the probability that a user accidentally performs an operation is reduced, and such configuration assists the user in memorizing a current editing status and editing type, thereby improving the operation efficiency of the user. The following uses the sound control tool as an example for description.

In addition, the script lines of a virtual character may be displayed in the visual graphic editing region. For example, the script lines of the virtual character is "the weather is nice today and is suitable for travel". A first line segment of the script lines may be "nice weather, suitable for travel". After selecting "nice weather, suitable for travel," the user clicks on an editing option for the virtual character in an editing toolbar to perform corresponding editing.

Step S220: display a sound editing window for the first line segment of the script lines of the virtual character according to a trigger operation performed with respect to the sound control tool.

Specifically, the user may click on the sound control tool to perform an operation. Accordingly, the display status of the sound control tool may be changed to be in the editing state. After a sound editing operation is completed, "nice weather, suitable for travel" may be displayed to be in an edited state.

In addition, sound editing may have various types and various editing parameters. The sound editing window may be used to input sound editing information corresponding to various editing types and editing parameters for the sound editing operation so that a corresponding editing operation can be generated according to the sound editing information.

In addition, the sound editing window may be displayed based on a position of the first line segment. For example, the sound editing window is displayed at a position on the periphery of the first line segment. The sound editing window may be such window.

Step S230: generate a sound editing operation for the first line segment according to the sound editing information inputted in the sound editing window for the first line segment.

Specifically, an editable state of the sound editing window may be displayed while the sound editing window is displayed. For example, a highlighted or blinking cursor is displayed in the sound editing window to indicate to the user an input position. The sound editing information may be inputted in the sound editing window based on the position of the cursor. The sound editing information may indicate at least one of a sound pause duration, sound pronunciation, sound rhythm, sound speed, and sound content correction information of the first line segment.

For example, in a specified position selected by the cursor, a pause tool is clicked on to display an input window and pause duration information is inputted therein, and the pause duration information is inserted into the script lines in a highlighted manner.

For another example, the first line segment may be selected by means of a swipe operation, and a floating toolbar may be presented in response to the swipe operation and based on the position of the first line segment. The floating toolbar may include various control tools. For example, among the various control tools in the toolbar on the scenario editing interface, a control tool related to a subsequent operation to be performed on the first line segment is determined in response to the swipe operation, and the related control tool is presented in the floating toolbar. An annotation tool in the floating toolbar may be triggered to annotate the first line segment. After the annotation tool is triggered, the floating toolbar may be hidden.

For another example, a pronunciation tool in the floating toolbar may be selected to display a pronunciation input window. Corrected pronunciation information may be inputted in the pronunciation input window. After the pronunciation tool is selected, the floating toolbar may be hidden. The corrected pronunciation information may be inserted into the first line segment.

For another example, a text replacement tool in the floating toolbar may be selected to display a text replacement window. Replacement text may be inputted in the text replacement window. After the text replacement tool is selected, the floating toolbar may be hidden. The replacement text may be inserted into the first line segment.

In addition, in this example, an action editing operation may also be performed according to a trigger operation performed with respect to the action control tool. For a specific implementation manner, reference may be made to the above corresponding embodiment.

Step 240: display, in the visual graphic editing region, a graphic markup card corresponding to the scenario element editing operation.

Step 250: generate and display, in the script editing region, a markup language script corresponding to the scenario element editing operation.

Specifically, the markup language script includes a tag corresponding to the first line segment and a tag corresponding to the sound editing information. A markup language script may be generated based on the above various tags and script language logic.

In the solution of this embodiment, a corresponding editing operation can be generated according to the trigger operation performed with respect to the sound control tool for the virtual character on the interface, thereby improving the efficiency of performing the sound editing operation or the action editing operation with respect to the virtual character and improving the efficiency of editing the virtual scenario.

Figure 3A:
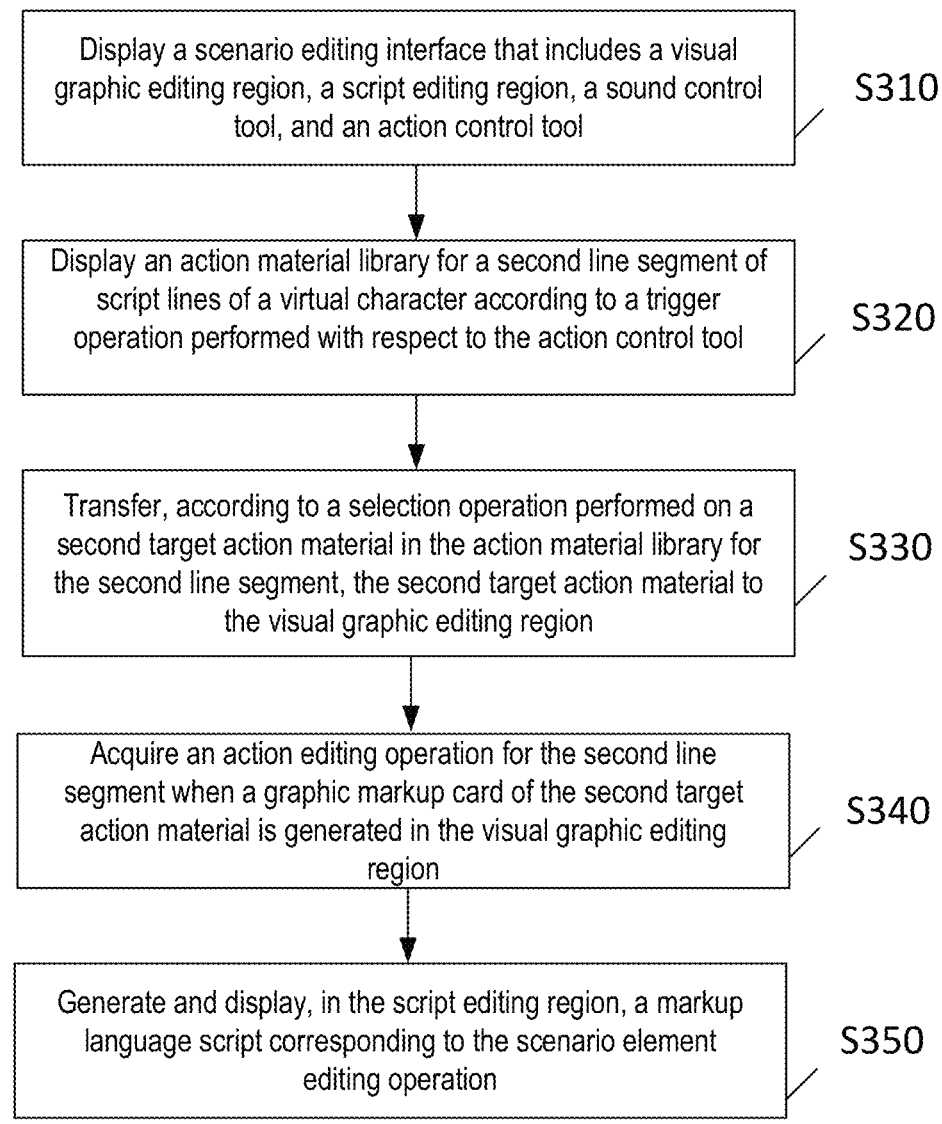
FIG. 3A is a flow diagram illustrating a scenario editing method according to some of the example embodiments.
Figure 3B:
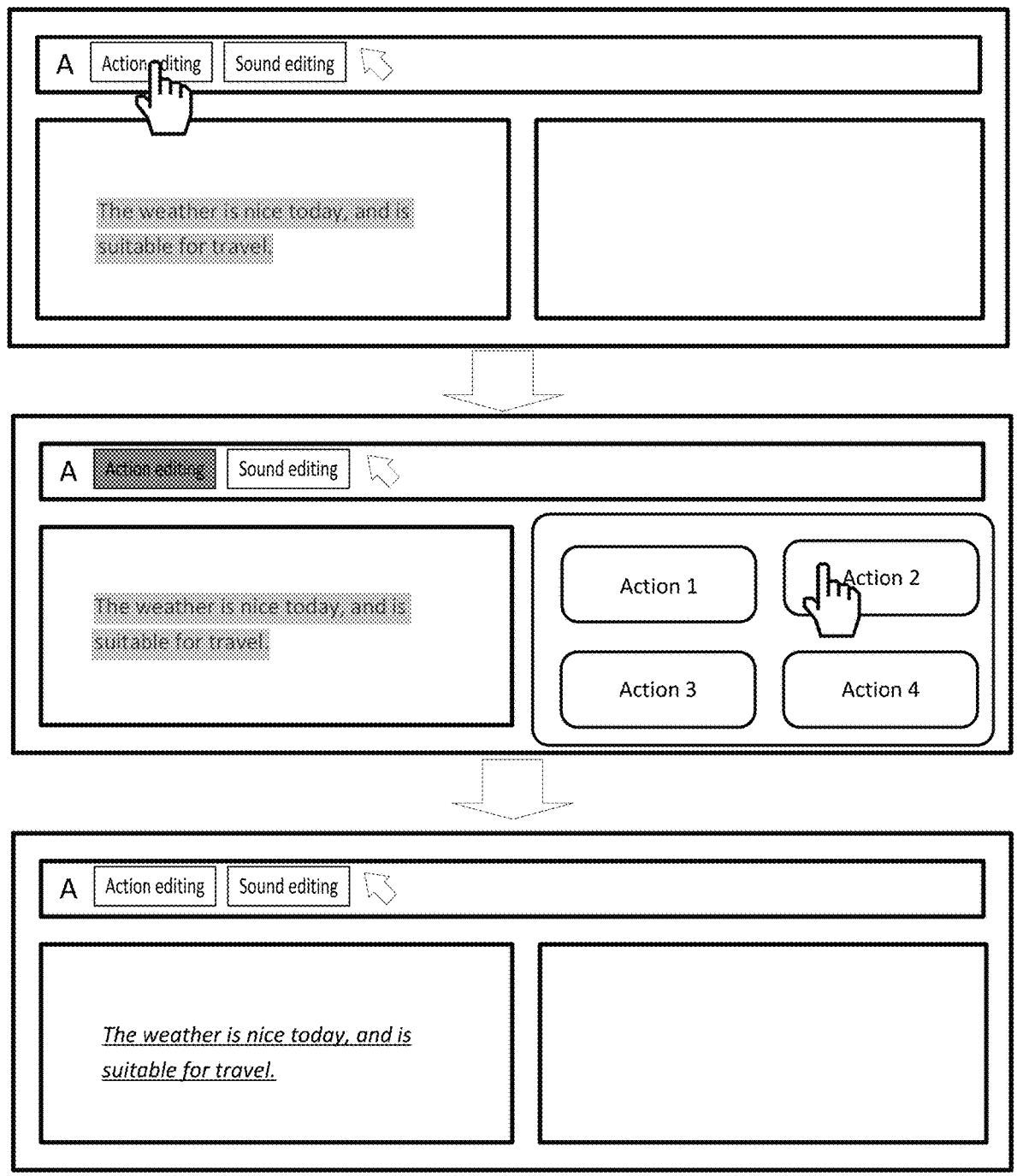
FIG. 3B is a block diagram of a change in a scenario editing interface according to some of the example embodiments.

FIG. 3A is a flow diagram illustrating a virtual multimedia scenario editing method according to some of the example embodiments. FIG. 3B is a block diagram of a change in a scenario editing interface according to some of the example embodiments. The virtual multimedia scenario editing method shown in FIG. 3A will be described below with reference to the scenario editing interface in FIG. 3B. The virtual multimedia scenario editing method includes the following steps.

Step S310: display a scenario editing interface that includes a visual graphic editing region, a script editing region, a sound control tool, and an action control tool.

Specifically, the sound control tool and the action control tool serving as multimedia control tools may be arranged in a floating toolbar or may be arranged in a fixed toolbar on an interface. Both the sound control tool and the action control tool may include an editing state and a non-editing state. For example, one of the sound control tool and the action control tool is selected to enter the editing state, and the other is in the non-editing state. Therefore, the probability that a user accidentally performs an operation is reduced, and such configuration assists the user in memorizing a current editing status and editing type, thereby improving the operation efficiency of the user. The following uses the action control tool as an example for description.

In addition, script lines of a virtual character may be displayed in the visual graphic editing region. For example, the script lines of the virtual character is "the weather is nice today and is suitable for travel." A second line segment of the script lines may be "the weather is nice today and is suitable for travel." After selecting "the weather is nice today, and is suitable for travel" (that is, the entire script lines are selected), the user clicks on an editing option for the virtual character in an editing toolbar to perform corresponding editing.

Step S320: display an action material library for the second line segment of script lines of the virtual character according to a trigger operation performed with respect to the action control tool.

Specifically, the user clicks on the action control tool to perform an operation. Accordingly, the display status of the action control tool may be changed from a non-editing state to an editing state. In addition, an action material library including action material 1 to action material 4 is displayed above the script editing region in response to the triggering of the action control tool. The action material library may be in the form of a floating window above the script editing region. The action material library may be in the form of an opaque layer covering the script editing region. Alternatively, the action material library may be in the form of a transparent layer arranged above the script editing region.

Step S330: transfer, according to a selection operation performed on a second target action material in the action material library for the second line segment, the second target action material to the visual graphic editing region.

Specifically, after the action editing operation is completed, the action control tool is changed to be in the non-editing state. "The weather is nice today and is suitable for travel" is displayed to be in an edited state. The action material library above the script editing region may be hidden in response to the selection operation performed on the second target action material to reveal the script editing region. A process during which the second target action material is moved to the visual graphic editing region may be dynamically displayed. For example, the effect showing a movement path created in the moving process is displayed. Alternatively, the second target action material may be displayed in the visual graphic editing region while the second target action material is hidden in the action material library, and then the action material library not including the second target action material is hidden.

Step S340: acquire an action editing operation for the second line segment when a graphic markup card of the second target action material is generated in the visual graphic editing region.

Specifically, the graphic markup card may be generated according to "the weather is nice today, and is suitable for travel," and can be displayed in the visual graphic editing region. The graphic markup card includes "the weather is nice today and is suitable for travel." For example, the action editing operation may be generated according to the second line segment and the second target action material when the graphic markup card of the second target action material is generated in the visual graphic editing region.

Step S350: generate and display, in the script editing region, a markup language script corresponding to the scenario element editing operation.

Specifically, the markup language script includes a tag corresponding to the second line segment and a tag corresponding to the second target action material. A markup language script may be generated based on the above various tags and script language logic.

In the solution of this embodiment, a corresponding editing operation can be generated according to the trigger operation performed with respect to the action control tool for the virtual character on the interface, thereby improving the efficiency of the action editing operation or the action editing operation for the virtual character and improving the efficiency of editing the virtual scenario.

Figure 4A:
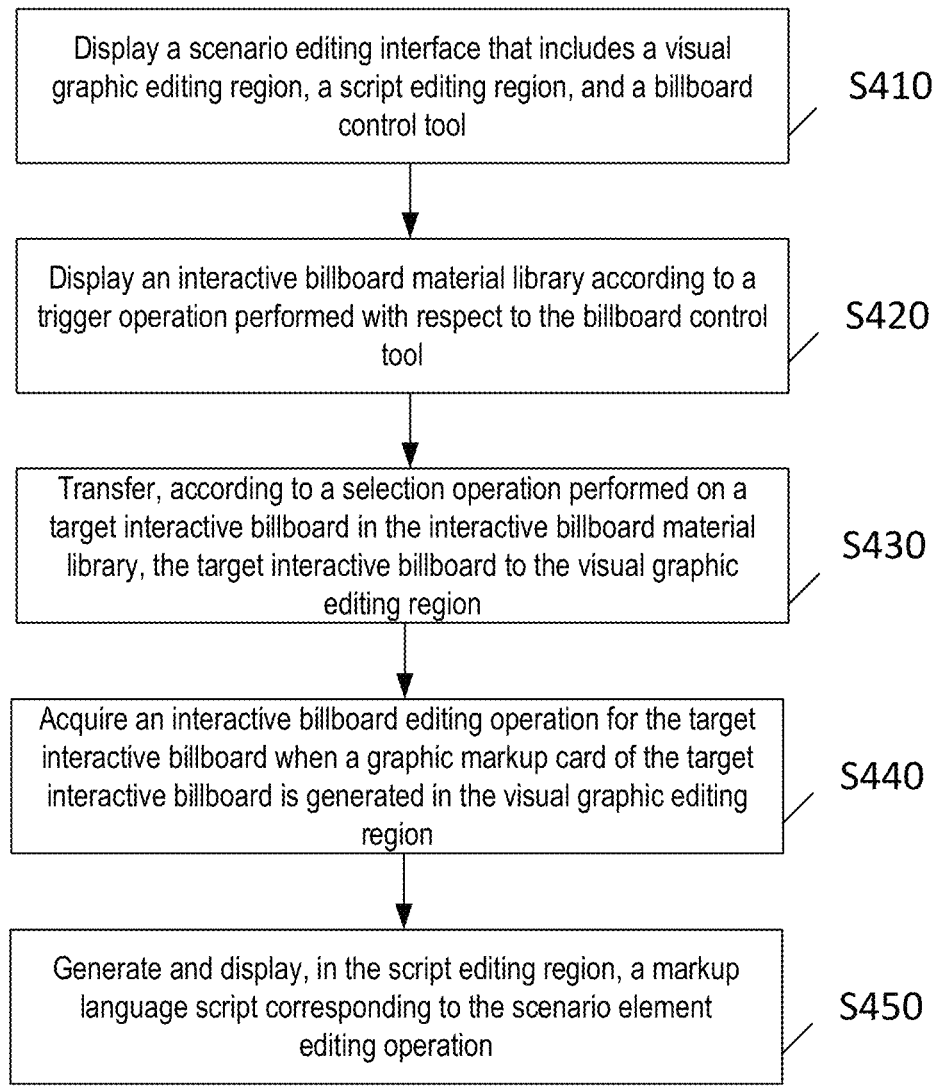
FIG. 4A is a flow diagram illustrating a scenario editing method according to some of the example embodiments.
Figure 4B:
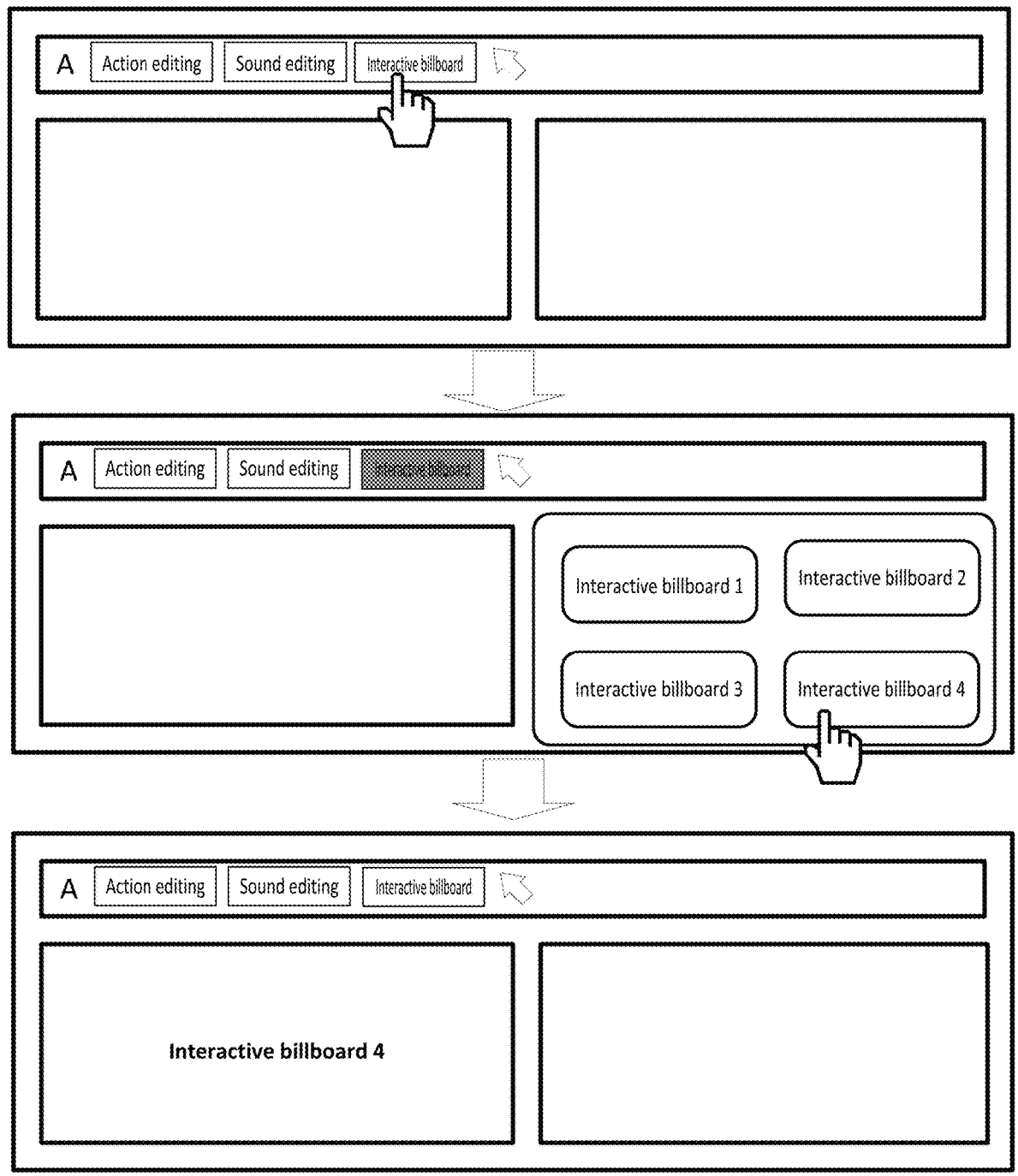
FIG. 4B is a block diagram of a change in a scenario editing interface according to some of the example embodiments.

FIG. 4A is a flow diagram illustrating a virtual multimedia scenario editing method according to some of the example embodiments. FIG. 4B is a block diagram of a change in a scenario editing interface according to some of the example embodiments. The virtual multimedia scenario editing method shown in FIG. 4A will be described below with reference to the change in the scenario editing interface in FIG. 4B. The virtual multimedia scenario editing method includes the following steps.

Step S410: display a scenario editing interface that includes a visual graphic editing region, a script editing region, and a billboard control tool.

Specifically, the billboard control tool serving as a virtual object is used to generate an interactive billboard. The interactive billboard is used to interact with a user (viewer) in a virtual multimedia scenario. For example, the interactive billboard may include interactive information such as product information, teaching information, plot information, etc. The interactive billboard may further include a control such as a web link, an interactive control (such as a teaching interactive control), or the like capable of being triggered by the user or directing the user to another interface.

In addition, the billboard control tool may be arranged in a floating toolbar or may be arranged in a fixed toolbar on the interface. The billboard control tool may include an editing state and a non-editing state, and such configuration assists the user in memorizing a current editing status and editing type, thereby improving the operation efficiency of the user.

Step S420: display an interactive billboard material library according to a trigger operation performed with respect to the billboard control tool.

Specifically, the user clicks on an interactive billboard editing option in an editing toolbar to perform corresponding editing. Accordingly, a display status of the interactive billboard control tool may be changed to the editing state. In addition, an interactive billboard material library including interactive billboard 1 to interactive billboard 4 is displayed above the script editing region in response to triggering of the action control tool. The interactive billboard material library may be in the form of a floating window above the script editing region. The interactive billboard material library may be in the form of an opaque layer covering the script editing region. Alternatively, the interactive billboard material library may be in the form of a transparent layer arranged above the script editing region.

Step S430: transfer, according to a selection operation performed on a target interactive billboard in the interactive billboard material library, the target interactive billboard to the visual graphic editing region.

Specifically, after the target interactive billboard is selected from the interactive billboard material library, product-related information, such as a product hyperlink, a product image, product description information, etc., may be inputted. Teaching-related information, such as a student answer, question information, teaching interaction information, etc., may also be inputted. Plot-related information may also be inputted.

In addition, after an action editing operation is completed, the interactive billboard editing control tool is changed to the non-editing state. The product-related information may be displayed to be in an edited state. In other words, a graphic markup card is generated according to the product-related information and is displayed in the visual graphic editing region. The graphic markup card may include the product-related information.

Step S440: acquire an interactive billboard editing operation for the target interactive billboard when a graphic markup card of the target interactive billboard is generated in the visual graphic editing region.

Specifically, the graphic markup card may be generated according to the target interactive billboard and displayed in the visual graphic editing region. The graphic markup card includes interactive billboard information such as product information, teaching information, plot information, etc. For example, an action editing operation may be generated according to the target interactive billboard (e.g., an identifier of the target interactive billboard) and the interactive billboard information when a graphic markup card of a second target action material is generated in the visual graphic editing region.

Step S450: generate and display, in the script editing region, a markup language script corresponding to the scenario element editing operation.

In the solution of this embodiment, a corresponding editing operation can be generated according to a trigger operation performed with respect to a billboard editing tool option on the interface, thereby improving the efficiency of a billboard editing operation, and further improving the efficiency of scenario editing. The solutions in the foregoing embodiments may be combined in any manner, or the solution in each embodiment may be performed multiple times according to requirements of a virtual multimedia scenario. For example, action editing of a virtual character, sound editing of the virtual character, and an editing operation for a virtual object may be combined together in any order to form a virtual multimedia scenario. In addition, action editing and sound editing of different virtual characters are also relatively independent operations. In other words, the descriptions for the above various embodiments are for the purpose of facilitating understanding, and should not be construed as limiting a combination of various variants.

Figure 5:
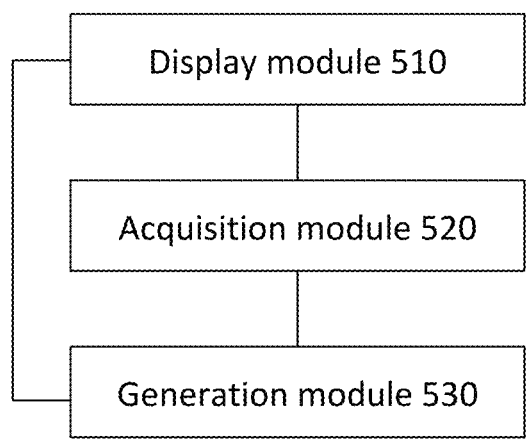
FIG. 5 is a block diagram of a scenario editor according to some of the example embodiments.

FIG. 5 is a block diagram of a scenario editor according to some of the example embodiments. The virtual multimedia scenario editor of FIG. 5 includes a display module 510 used to display a scenario editing interface, the scenario editing interface including a visual graphic editing region, a script editing region, and at least scenario editing tool option; an acquisition module 520 used to acquire a trigger operation performed with respect to the scenario editing tool option; and a generation module 530 used to generate a scenario element editing operation according to the trigger operation.

The display module 510 is further used to display, in the visual graphic editing region, a graphic markup card corresponding to the scenario element editing operation; and generate and display, in the script editing region, a markup language script corresponding to the scenario element editing operation.

According to the solution provided by the embodiment of the application, a scenario element editing operation can be generated according to a trigger operation performed with respect to at least one scenario editing tool option, and a graphic markup card corresponding to the scenario element editing operation can be displayed in a visual graphic editing region. Therefore, low-code development of the scenario element editing operation is achieved, development difficulties faced by a user is reduced, and development efficiency is improved. In addition, a markup language script corresponding to the scenario element editing operation is generated and displayed in a script editing region. Therefore, the markup language script is obtained, and compatibility with existing development processes is improved.

In some embodiments, the scenario editing tool option includes an editing tool option for a virtual character in a scenario, and/or an editing tool option for virtual objects other than the character in the scenario. The generation module is specifically used to: generate, according to the trigger operation, an editing operation for a corresponding virtual character and/or editing operations for other virtual objects in a virtual scenario.

In some embodiments, the editing tool option for the virtual character includes a selection control tool and a multimedia control tool for the virtual character. The multimedia control tool for the virtual character includes at least one of a line control tool, a sound control tool, and an action control tool. The generation module is specifically used to display, in the visual graphic editing region and according to a trigger operation performed with respect to the selection control tool, the corresponding virtual character in the virtual scenario; and generate a multimedia editing operation for the virtual character according to a trigger operation performed with respect to the multimedia control tool for the virtual character.

In some embodiments, the editor further includes a status switching module used to switch, according to the trigger operation performed with respect to the selection control tool, the multimedia control tool for the virtual character from a non-triggerable state to a triggerable state.

In some embodiments, the generation module is specifically used to display a sound editing window for a first line segment of script lines of the virtual character according to a trigger operation performed with respect to the sound control tool; generate a sound editing operation for the first line segment according to sound editing information inputted in the sound editing window for the first line segment; and/or display an action material library for the first line segment according to a trigger operation performed with respect to the action control tool; transfer, according to a selection operation performed on a first target action material in the action material library for the first line segment, the first target action material to the visual graphic editing region; and acquire an action editing operation for the first line segment when a graphic markup card of the first target action material is generated in the visual graphic editing region.

In some embodiments, the display module is specifically used to: display, in the visual graphic editing region, a graphic markup card of the sound editing operation. The graphic markup card includes the sound editing information and the first line segment.

In some embodiments, the display module is further used to: display a text input window in the visual graphic editing region according to a trigger operation performed with respect to the line control tool so as to acquire the script lines of the virtual character in the text input window. The acquisition module is further used to: acquire the first line segment according to a selection operation performed on at least part of the script lines.

In some embodiments, the sound editing information indicates at least one of a sound pause duration, sound pronunciation, sound rhythm, sound speed, and sound content correction information of the first line segment.

In some embodiments, the display module is specifically used to: display a floating toolbar at the first line segment according to the trigger operation performed with respect to the sound control tool; and display the sound editing window according to a selection operation performed on a sound editing control in the floating toolbar while hiding the floating toolbar.

In some embodiments, the generation module is specifically used to: display an action material library for a second line segment of script lines of the virtual character according to a trigger operation performed with respect to the action control tool; transfer, according to a selection operation performed on a second target action material in the action material library for the second line segment, the second target action material to the visual graphic editing region; acquire an action editing operation for the second line segment when a graphic markup card of the second target action material is generated in the visual graphic editing region; and/or display a sound editing window for the second line segment according to a trigger operation performed with respect to the sound control tool; and generate a sound editing operation for the second line segment according to sound editing information inputted in the sound editing window for the second line segment.

In some embodiments, the display module is specifically used to: dynamically pop up an action material display board along a boundary of the script editing region according to the trigger operation performed with respect to the action control tool so as to block the script editing region and cause the action control tool to enter an unavailable state. Various action materials for the second line segment of the script lines of the virtual character are arranged on the action material display board.

In some embodiments, the display module is further used to: display a text input window in the visual graphic editing region according to a trigger operation performed with respect to the line control tool so as to acquire the script lines of the virtual character in the text input window; and acquire the second line segment according to a selection operation performed on at least part of the script lines.

In some embodiments, the acquisition module is further used to: display an action editing timeline corresponding to the script lines of the virtual character, the action editing timeline including a draggable control for indicating an action node; and determine the second line segment according to a correspondence between a drag position of the draggable control on the action editing timeline and characters of the script lines of the virtual character.

In some embodiments, the editing tool option for the other virtual objects includes a billboard control tool. The generation module is further used to: display an interactive billboard material library according to a trigger operation performed with respect to the billboard control tool; transfer, according to a selection operation performed on a target interactive billboard in the interactive billboard material library, the target interactive billboard to the visual graphic editing region; and acquire an interactive billboard editing operation for the target interactive billboard when a graphic markup card of the target interactive billboard is generated in the visual graphic editing region.

In some embodiments, the generation module is further used to: display an editable window of the target interactive billboard according to the selection operation performed on the target interactive billboard; acquire product information inputted in the editable window; and display, in the visual graphic editing region and below the graphic markup card of the scenario element editing operation, a graphic markup card including the product information.

In some embodiments, the generation module is further used to: adjust the markup language script in the script editing region according to the product information, so that the adjusted markup language script includes a character string of the product information.

In some embodiments, the generation module is specifically used to: determine a markup language script corresponding to the graphic markup card of the scenario element editing operation; and generate and display the markup language script in the script editing region.

In some embodiments, the editor further includes: a fusion module used to locally fuse respective graphic markup cards of all visual graphic operations according to a scenario association order of respective visual graphic operations in the visual graphic editing region, so as to generate a local scenario preview file.

In some embodiments, the editor further includes: an uploading module used to upload the markup language script to a server, so as to play a virtual scenario indicated by the markup language script.

The apparatus according to this embodiment is used to implement the corresponding methods in the method embodiments described above, and has beneficial effects of the corresponding method embodiments. Details will not be described herein again. In addition, for implementation of functions of various modules in the apparatus according to this embodiment, reference can be made to the corresponding part in the method embodiments described above, and details will also not be described herein again.

Figure 6:
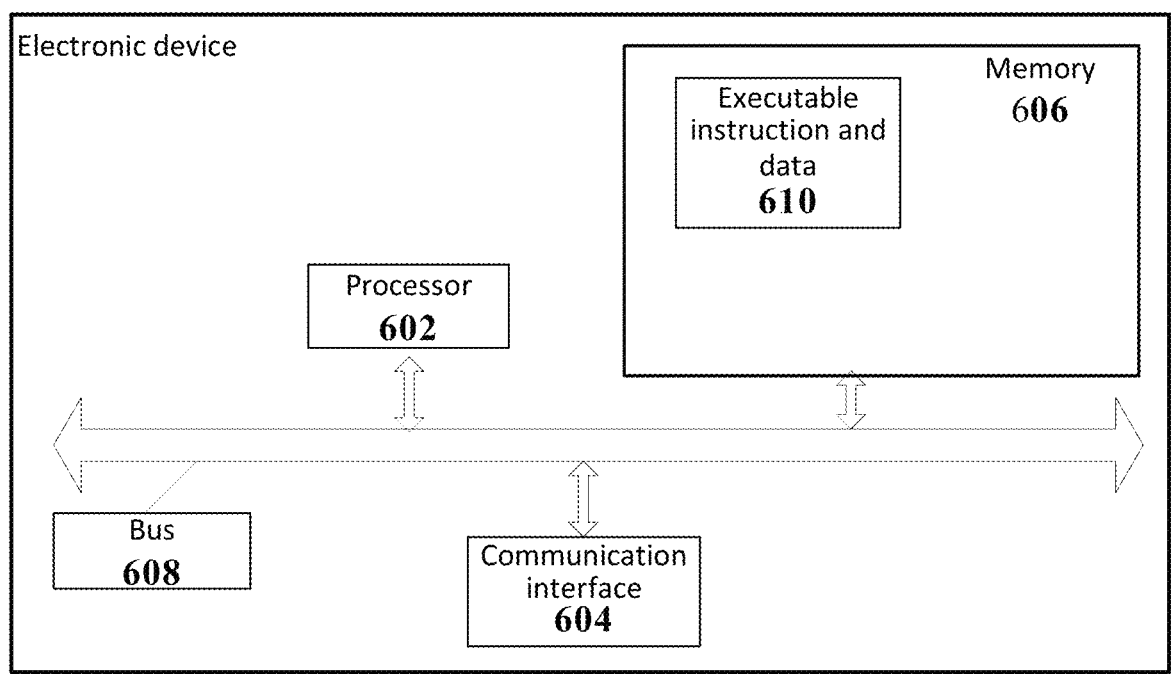
FIG. 6 is a block diagram of an electronic device according to some of the example embodiments.

Referring to FIG. 6, a block diagram of an electronic device according to some of the example embodiments is shown. The specific embodiments of the application do not limit specific implementation of the electronic device.

As shown in FIG. 6, the electronic device may include: a processor 602, a display 604, a memory 606, and a communication bus 608, wherein the processor 602, the display 604, and the memory 606 communicate with each other by means of the communication bus 608.

The display 604 is used to display an application interface of a virtual multimedia scenario editing application. The application interface includes a visual graphic editing region, a script editing region, and at least one scenario editing tool option. The at least one scenario editing tool option is used to present a corresponding editing tool and receive an operation of a user performed with respect to the scenario editing tool option. The visual graphic editing region is used to display a corresponding graphic markup card according to the operation. The script editing region is used to display a corresponding markup language script according to the operation.

The processor 602 is used to execute an executable instruction and data 610, and can specifically execute the related steps in the above method embodiments.

Specifically, the executable instruction and data 610 may include program code, and the program code includes computer operation instructions.

The processor 602 may be a central processing unit (CPU) or an application specific integrated circuit (ASIC), or is configured to be one or a plurality of integrated circuits for implementing the embodiments of the application. The intelligent device includes one or a plurality of processors, which can be processors of the same type, such as one or a plurality of CPUs, and can also be processors of different types, such as one or a plurality of CPUs and one or a plurality of ASICs. The processor is used to perform, according to the executable instruction and data read from the memory, operations corresponding to the virtual multimedia scenario editing application.

The memory 606 is used to store the executable instruction and the data 610 related to the virtual multimedia scenario editing application. The memory 606 may include a high-speed RAM, and may also include a non-volatile memory, such as at least one disk memory.

In addition, for specific implementation of the steps regarding the executable instruction and the data 610, reference may be made to the corresponding description of the corresponding steps and units in the above method embodiments, and details will not be described herein again. Those skilled in the art could clearly understand that for a convenient and concise description, for specific operation processes of the aforementioned devices and modules, references can be made to description of the corresponding processes in the aforementioned method embodiments, and details will not be described herein again.

In some embodiments, the at least one scenario editing tool option includes: an editing tool option for a virtual character in a scenario, and/or an editing tool option for virtual objects other than the character in the scenario.

In some embodiments, the editing tool option for the virtual character includes a selection control tool and a multimedia control tool for the virtual character. The multimedia control tool for the virtual character includes at least one of a line control tool, a sound control tool, and an action control tool. The visual graphic editing region is specifically used to: display, according to a trigger operation performed with respect to the selection control tool, the corresponding virtual character in the virtual scenario; and display a graphic markup card of a multimedia editing operation for the virtual character according to a trigger operation performed with respect to the multimedia control tool for the virtual character.

In some embodiments, the visual graphic editing region is specifically used to: display a sound editing window according to a trigger operation performed with respect to the sound control tool; and display, according to editing content inputted in the sound editing window, a corresponding graphic markup card including the editing content, and hide the sound editing window.

In some embodiments, the script editing region is further used to: display an action material library according to a trigger operation performed with respect to the action control tool, and hide the action material library according to a selection operation performed on a target action material in the action material library. The visual graphic editing region is specifically used to: display a graphic markup card of the target action material according to the selection operation performed on the target action material in the action material library.

In some embodiments, the visual graphic editing region is specifically used to: display a text input window according to a trigger operation performed with respect to the line control tool so as to acquire the script lines of the virtual character in the text input window.

In some embodiments, the editing tool option for the other virtual objects includes a billboard control tool. The script editing region is further used to: display an interactive billboard material library according to a trigger operation performed with respect to the billboard control tool, and hide the interactive billboard material library according to a selection operation performed on the target interactive billboard in the interactive billboard material library. The visual graphic editing region is specifically used to: display a graphic markup card of the target interactive billboard according to the selection operation performed on the target interactive billboard in the interactive billboard material library.

It should be pointed out that depending on requirements for implementation, each component/step described In some embodiments can be split into more components/steps, or two or more components/steps or parts of the components/steps can be combined into new components/steps to achieve the objectives of the embodiments of the application.

The above method according to the embodiments of the application may be implemented in hardware or firmware, or may be implemented as software or computer code that can be stored in a recording medium (such as a CD ROM, a RAM, a floppy disk, a hard disk, or an optical disc), or may be implemented as computer code downloaded over a network, originally stored in a remote recording medium or a non-transitory machine readable medium, and to be stored in a local recording medium. Thus, the method described herein can be processed by software stored in a recording medium used in a general-purpose computer, a special-purpose processor, or programmable or special-purpose hardware (such as an ASIC or an FPGA). It may be understood that a computer, a processor, a microprocessor controller, or programmable hardware includes a storage component (e.g., a RAM, a ROM, a flash, etc.) that can store or receive software or computer code that implements the method described herein when accessed and executed by a computer, a processor, or hardware. In addition, when a general-purpose computer accesses code for implementing the method illustrated herein, the execution of the code converts the general-purpose computer into a dedicated computer for performing the method illustrated herein.

Those of ordinary skill in the art may be aware that, the units and method steps in the examples described with reference to the embodiments disclosed herein may be implemented by electronic hardware or a combination of computer software and electronic hardware. Whether these functions are performed by hardware or software depends on particular application and design constraint conditions of the technical solutions. A person skilled in the art may use a different method to implement the described functions for each particular application, but it should not be considered that such implementation goes beyond the scope of the embodiments of the application.

The above implementations are used merely to describe the embodiments of the application rather than limit the embodiments of the application. Those of ordinary skill in related art may also make various changes and variations without departing from the spirit and the scope of the embodiments of the application, so that all equivalent technical solutions also fall into the scope of the embodiments of the application. The scope of patent protection of the embodiments of the application shall be defined by the claims.

What is claimed is:

1. A method comprising:
displaying, by a processor, a scenario editing interface, the scenario editing interface comprising a visual graphic editing region, a script editing region, and at least one scenario editing tool option, the at least one scenario editing tool option comprising one or more of a sound control tool and an action control tool for a virtual character;
detecting, by the processor, a trigger operation performed with respect to the scenario editing tool option;
generating, by the processor, a scenario element editing operation according to the trigger operation;
displaying, by the processor, in the visual graphic editing region, a graphic markup card corresponding to the scenario element editing operation; and
generating and displaying, by the processor, in the script editing region, a markup language script corresponding to the scenario element editing operation.

2. The method of claim 1, wherein the at least one scenario editing tool option comprises at least one editing tool option for a virtual character or a virtual object in the scenario and wherein generating a scenario element editing operation according to the trigger operation comprises generating an editing operation for a corresponding virtual character or virtual object.

3. The method of claim 2, wherein the editing tool option for the virtual character comprises a selection control tool and a multimedia control tool for the virtual character, the multimedia control tool comprising one of a script line control tool, a sound control tool, or an action control tool, and wherein generating the editing operation for a corresponding virtual character comprises:
displaying, by the processor, in the visual graphic editing region and according to a trigger operation performed with respect to the selection control tool, the corresponding virtual character in the virtual scenario; and generating, by the processor, a multimedia editing operation for the virtual character according to a trigger operation performed with respect to the multimedia control tool for the virtual character.

4. The method of claim 3, further comprising switching, by the processor, according to the trigger operation performed with respect to the selection control tool, the multimedia control tool for the virtual character from a non-triggerable state to a triggerable state.

5. The method of claim 3, wherein generating the multimedia editing operation for the virtual character according to the trigger operation performed with respect to the multimedia control tool for the virtual character comprises one of:

displaying, by the processor, a sound editing window for a first line segment of script lines of the virtual character according to a trigger operation performed with respect to the sound control tool and generating a sound editing operation for the first line segment according to sound editing information inputted in the sound editing window for the first line segment; or displaying, by the processor, an action material library for the first line segment according to a trigger operation performed with respect to the action control tool, transferring, according to a selection operation performed on a first target action material in the action material library for the first line segment, the first target action material to the visual graphic editing region, and acquiring an action editing operation for the first line segment when a graphic markup card of the first target action material is generated in the visual graphic editing region.

6. The method of claim 5, wherein the sound editing information indicates one of a sound pause duration, sound pronunciation, sound rhythm, sound speed, or sound content correction information of the first line segment.

7. The method of claim 5, wherein displaying a sound editing window for a first line segment of script lines of the virtual character according to a trigger operation performed with respect to the sound control tool comprises:

displaying, by the processor, a floating toolbar at the first line segment according to the trigger operation performed with respect to the sound control tool; and displaying, by the processor, the sound editing window according to a selection operation performed on a sound editing control in the floating toolbar and hiding the floating toolbar.

8. The method of claim 3, wherein generating the multimedia editing operation for the virtual character according to the trigger operation performed with respect to the multimedia control tool for the virtual character comprises one of:

displaying, by the processor, an action material library for a second line segment of script lines of the virtual character according to a trigger operation performed with respect to the action control tool, transferring, according to a selection operation performed on a second target action material in the action material library for the second line segment, the second target action material to the visual graphic editing region, and acquiring an action editing operation for the second line segment when a graphic markup card of the second target action material is generated in the visual graphic editing region; or displaying, by the processor, a sound editing window for the second line segment according to a trigger operation performed with respect to the sound control tool, and generating a sound editing operation for the second line segment according to sound editing information inputted in the sound editing window for the second line segment.

9. The method of claim 8, wherein displaying an action material library for a second line segment of script lines of the virtual character according to a trigger operation performed with respect to the action control tool comprises:

dynamically popping up, by the processor, an action material display board along a boundary of the script editing region according to the trigger operation performed with respect to the action control tool to block the script editing region, and causing the action control tool to enter an unavailable state, wherein various action materials for the second line segment of the script lines of the virtual character are arranged on the action material display board.

10. The method of claim 8, further comprising:

displaying, by the processor, a text input window in the visual graphic editing region according to a trigger operation performed with respect to the line control tool to acquire the script lines of the virtual character in the text input window; and acquiring, by the processor, the second line segment according to a selection operation performed on at least part of the script lines.

11. The method of claim 10, wherein the acquiring the second line segment according to a selection operation performed on at least part of the script lines comprises:

displaying, by the processor, an action editing timeline corresponding to the script lines of the virtual character, the action editing timeline comprising a draggable control for indicating an action node; and determining, by the processor, the second line segment according to a correspondence between a drag position of the draggable control on the action editing timeline and words of the script lines of the virtual character.

12. The method of claim 2, wherein the editing tool option for the virtual object comprises a billboard control tool, and wherein generating the editing operation for a corresponding virtual object in a virtual scenario comprises:

displaying, by the processor, an interactive billboard material library according to a trigger operation performed with respect to the billboard control tool;

transferring, by the processor, according to a selection operation performed on a target interactive billboard in the interactive billboard material library, the target interactive billboard to the visual graphic editing region; and acquiring, by the processor, an interactive billboard editing operation for the target interactive billboard when a graphic markup card of the target interactive billboard is generated in the visual graphic editing region.

13. A non-transitory computer-readable storage medium for tangibly storing computer program instructions capable of being executed by a computer processor, the computer program instructions defining steps of:

displaying a scenario editing interface, the scenario editing interface comprising a visual graphic editing region, a script editing region, and at least one scenario editing tool option, the at least one scenario editing tool option comprising one or more of a sound control tool and an action control tool for a virtual character;

detecting a trigger operation performed with respect to the scenario editing tool option;

generating a scenario element editing operation according to the trigger operation;

displaying, in the visual graphic editing region, a graphic markup card corresponding to the scenario element editing operation; and generating and displaying, in the script editing region, a markup language script corresponding to the scenario element editing operation.

14. The non-transitory computer-readable storage medium of claim 13, wherein the at least one scenario editing tool option comprises an editing tool option for a virtual character or a virtual object in the scenario and wherein generating a scenario element editing operation according to the trigger operation comprises generating an editing operation for a corresponding virtual character or virtual object.

15. The non-transitory computer-readable storage medium of claim 14, wherein the editing tool option for the virtual character comprises a selection control tool and a multimedia control tool for the virtual character, the multimedia control tool comprising one of a script line control tool, a sound control tool, or an action control tool, and wherein generating the editing operation for a corresponding virtual character comprises:

displaying, in the visual graphic editing region and according to a trigger operation performed with respect to the selection control tool, the corresponding virtual character in the virtual scenario; and generating a multimedia editing operation for the virtual character according to a trigger operation performed with respect to the multimedia control tool for the virtual character.

16. The non-transitory computer-readable storage medium of claim 15, the steps further comprising switching, according to the trigger operation performed with respect to the selection control tool, the multimedia control tool for the virtual character from a non-triggerable state to a triggerable state.

17. The non-transitory computer-readable storage medium of claim 15, wherein generating a multimedia editing operation for the virtual character according to a trigger operation performed with respect to the multimedia control tool for the virtual character comprises one of:

displaying a sound editing window for a first line segment of script lines of the virtual character according to a trigger operation performed with respect to the sound control tool and generating a sound editing operation for the first line segment according to sound editing information inputted in the sound editing window for the first line segment; or displaying an action material library for the first line segment according to a trigger operation performed with respect to the action control tool, transferring, according to a selection operation performed on a first target action material in the action material library for the first line segment, the first target action material to the visual graphic editing region, and acquiring an action editing operation for the first line segment when a graphic markup card of the first target action material is generated in the visual graphic editing region.

18. The non-transitory computer-readable storage medium of claim 15, wherein generating the multimedia editing operation for the virtual character according to the trigger operation performed with respect to the multimedia control tool for the virtual character comprises one of:

displaying an action material library for a second line segment of script lines of the virtual character according to a trigger operation performed with respect to the action control tool, transferring, according to a selection operation performed on a second target action material in the action material library for the second line segment, the second target action material to the visual graphic editing region, and acquiring an action editing operation for the second line segment when a graphic markup card of the second target action material is generated in the visual graphic editing region; or displaying a sound editing window for the second line segment according to a trigger operation performed with respect to the sound control tool, and generating a sound editing operation for the second line segment according to sound editing information inputted in the sound editing window for the second line segment.

19. The non-transitory computer-readable storage medium of claim 14, wherein the editing tool option for the virtual object comprises a billboard control tool, and wherein generating the editing operation for a corresponding virtual object in a virtual scenario comprises:

displaying an interactive billboard material library according to a trigger operation performed with respect to the billboard control tool;

transferring, according to a selection operation performed on a target interactive billboard in the interactive billboard material library, the target interactive billboard to the visual graphic editing region; and acquiring an interactive billboard editing operation for the target interactive billboard when a graphic markup card of the target interactive billboard is generated in the visual graphic editing region.

20. A device comprising:

a processor configured to:

display a scenario editing interface, the scenario editing interface comprising a visual graphic editing region, a script editing region, and at least one scenario editing tool option, the at least one scenario editing tool option comprising one or more of a sound control tool and an action control tool for a virtual character;

detect a trigger operation performed with respect to the scenario editing tool option;

generate a scenario element editing operation according to the trigger operation;

display, in the visual graphic editing region, a graphic markup card corresponding to the scenario element editing operation; and generate and display, in the script editing region, a markup language script corresponding to the scenario element editing operation.

* * * * *